C. H. TANNER.
Portable Cooking Apparatus.
No. 199,757.  Patented Jan. 29, 1878.
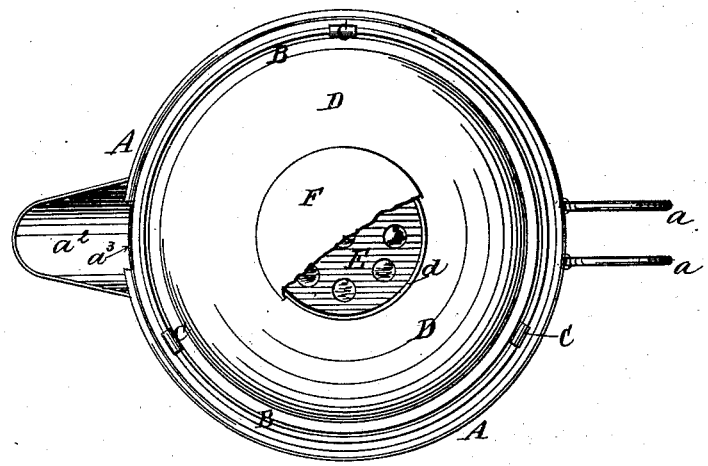
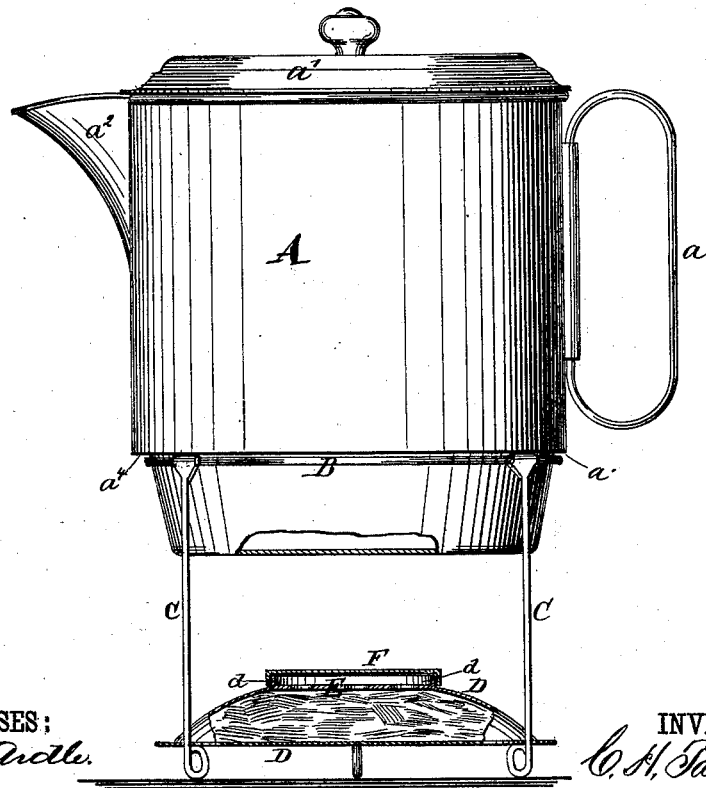

UNITED STATES PATENT OFFICE.

CHARLES H. TANNER, OF BOSTON, MASSACHUSETTS.

IMPROVEMENT IN PORTABLE COOKING APPARATUS.

Specification forming part of Letters Patent No. 199,757, dated January 29, 1878; application filed December 19, 1877.

*To all whom it may concern:*

Be it known that I, CHARLES HENRY TANNER, of Boston, in the county of Suffolk and State of Massachusetts, have invented a new and Improved Portable Cooking Apparatus, of which the following is a specification:

The object of my invention is to furnish a cheap and simple cooking apparatus, which may be quickly adjusted for use, and when not used may be packed up within the compass of its boiler proper.

The invention consists in the combination of a stove and a boiler, the said boiler being provided with a strainer, and the said stove being constructed of the combination of a tin receptacle (filled with asbestus, and having a perforated brass-plate burner, with detachable cover) and three legs, connected together at their upper ends by a ring for supporting the boiler, and near their lower ends secured rigidly to the said tin receptacle, the thus-constructed stove being made of a suitable size to allow of its being placed inside the said boiler, so that the apparatus, when packed, will occupy only the compass of its boiler, as will be hereinafter described.

In the accompanying drawings, Figure 1 is top view of my cooking apparatus, the stove being packed inside the boiler, and the cover of the latter removed. Fig. 2 is a side view of the same in position for use, and partly broken out to show the construction.

Similar letters of reference indicate corresponding parts.

A is the boiler, provided with the handles $a$, cover $a^1$, spout $a^2$, and the strainer $a^3$, the latter being inserted in the opening made in the boiler for the spout $a^2$. The bottom of the boiler is reduced in diameter sufficiently to form a horizontal annular rim or shoulder, $a^4$, for supporting the boiler on a ring, B, of less diameter than the inside diameter of the boiler A. This ring B is solidly connected to the upper ends of the legs C, the lower ends of which latter form the feet of the stove, and are rigidly secured to the tin receptacle D. This is filled with asbestus, (to be saturated with liquid fuel of any kind for supplying the heat required for cooking or boiling,) and provided with a perforated brass plate, E, covering the asbestus, and serving as the burner of the stove. The burner is covered, when not in use, by the lid F, the rim of which is made to fit snugly on the rim $d$ of the receptacle D. The said parts B C D E F together constitute the stove. When not in use, the said stove is put inside the boiler A, so that the whole apparatus will occupy no more space than the boiler itself, and may be packed conveniently for transportation or sale in an ordinary pasteboard box.

Having thus described my invention, I claim as new and desire to secure by Letters Patent—

The combination of the boiler A, provided with the strainer $a^3$, and the stove consisting of the tin receptacle D, with the perforated brass-plate burner E and cover F, the legs C, and the ring B, said stove being made of a size fitting it to be placed inside the boiler A, as and for the purpose specified.

CHARLES HENRY TANNER.

Witnesses:
LOUIS K. MATHER,
WILLIAM H. FRIEND.